United States Patent
Juels et al.

(10) Patent No.: US 9,118,661 B1
(45) Date of Patent: Aug. 25, 2015

(54) METHODS AND APPARATUS FOR AUTHENTICATING A USER USING MULTI-SERVER ONE-TIME PASSCODE VERIFICATION

(75) Inventors: Ari Juels, Brookline, MA (US); Nikolaos Triandopoulos, Arlington, MA (US); Marten Erik van Dijk, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/404,737

(22) Filed: Feb. 24, 2012

(51) Int. Cl.
*H04L 29/06* (2006.01)

(52) U.S. Cl.
CPC .................... *H04L 63/0838* (2013.01)

(58) Field of Classification Search
CPC . H04L 63/08; H04L 63/0838; H04L 63/0884; H04L 63/0892; H04W 12/06; H04W 12/08; G06F 21/00; G06F 21/30; G06F 21/31; G06F 21/40
USPC ............................................................ 726/4
See application file for complete search history.

(56) References Cited

U.S. PATENT DOCUMENTS

| | | | | |
|---|---|---|---|---|
| 6,959,394 B1* | 10/2005 | Brickell et al. | | 726/5 |
| 2002/0103857 A1* | 8/2002 | Soderberg et al. | | 709/203 |
| 2004/0030932 A1* | 2/2004 | Juels et al. | | 713/202 |
| 2007/0067828 A1* | 3/2007 | Bychkov | | 726/3 |
| 2009/0323972 A1* | 12/2009 | Kohno et al. | | 380/284 |

OTHER PUBLICATIONS

Brainard et al., A New Two-Server Approach for Authentication with Short Secrets, pp. 1-13, downloaded May 15, 2012.

* cited by examiner

*Primary Examiner* — Yogesh Paliwal
(74) *Attorney, Agent, or Firm* — Ryan, Mason & Lewis, LLP

(57) ABSTRACT

Methods and apparatus are provided for authenticating a user using multi-server one-time passcode verification. A user is authenticated by receiving authentication information from the user; and authenticating the user based on the received authentication information using at least two authentication servers, wherein the received authentication information is based on a secret shared between a security token associated with the user and an authentication authority that provides the at least two authentication servers. For example, the authentication information can comprise a passcode comprised of a tokencode from the security token and a password from the user. The user can be authenticated only if, for example, all of the at least two authentication servers authenticate the received authentication information.

34 Claims, 5 Drawing Sheets

METHODS AND APPARATUS FOR AUTHENTICATING A USER USING MULTI-SERVER ONE-TIME PASSCODE VERIFICATION

CROSS-REFERENCE TO RELATED APPLICATIONS

The present invention is related to U.S. patent application Ser. No. 13/404,780, entitled "Methods and Apparatus for Embedding Auxiliary Information in One-Time Passcode Authentication Tokens," (now U.S. Pat. No. 8,984,609), and U.S. patent application Ser. No. 13/404,788, entitled "Methods and Apparatus for Silent Alarm Channels Using One-Time Passcode Authentication Tokens," each filed contemporaneously herewith and incorporated by reference herein.

FIELD OF THE INVENTION

The present invention relates generally to security techniques for authenticating users over a network or in other types of communication systems.

BACKGROUND OF THE INVENTION

In order to gain access to applications or other resources via a computer or another user device, users are often required to authenticate themselves by entering authentication information. Such authentication information may comprise, for example, passwords that are generated by a security token carried by a user. These passwords may be one-time passwords that are generated using a time-synchronous or event-based algorithm. One particular example of a well-known type of security token is the RSA SecurID® user authentication token commercially available from RSA Security Inc. of Bedford, Mass., U.S.A.

In most existing token-based user authentication systems, a token belonging to a user U generates a one-time passcode for consumption by a single server S. In a symmetric-key-based scheme, the secret cryptographic keys from the token are shared with an authentication server. In most symmetric-key-based schemes, an adversary that compromises S can impersonate U by stealing the user's credentials from S. Such an attack requires only transient server compromise, i.e., the adversary need only learn the state of S, and need not alter its operation. This type of attack is referred to as a transient attack. In a stronger, active attack, the adversary controls the operation of S over an extended period of time. Such an adversary can completely subvert the authentication process, impersonating U even if the user's credentials are periodically refreshed, and even if authentication relies on public-key operations. This type of attack is referred to as an active attack.

A number of techniques have been proposed or suggested to reduce the susceptibility of authentication systems to such attacks. For example, U.S. Pat. No. 7,725,730 discloses secure authentication protocols for authenticating a client device, such as a mobile communications device having limited computational resources, using at least two servers. The two servers utilize information generated from a password to collectively authenticate the client device.

Nonetheless, a need remains for a multi-server authentication scheme based on symmetric-key cryptography. Yet another need remains for a multi-server authentication scheme where one-time passcodes are securely revealed to a plurality of servers.

SUMMARY OF THE INVENTION

Generally, methods and apparatus are provided for authenticating a user using multi-server one-time passcode verification. According to one aspect of the invention, a user is authenticated by receiving authentication information from the user; and authenticating the user based on the received authentication information using at least two authentication servers, wherein the received authentication information is based on a secret shared between a security token associated with the user and an authentication authority that provides the at least two authentication servers. For example, the authentication information can comprise a passcode comprised of a tokencode from the security token and a password from the user. The user can be authenticated only if, for example, all of the at least two authentication servers authenticate the received authentication information.

The authentication servers can communicate with one another during a commitment phase. For example, the authentication servers can each generate a partial passcode, and a first authentication server transmits a commitment value to a second authentication server and then the at least two authentication servers exchange the partial passcodes.

According to a further aspect of the invention, a session identifier is associated with the received authentication information. According to another aspect of the invention, a mistyped passcode can be distinguished from a random passcode.

The authentication techniques of the illustrative embodiments overcome one or more of the problems associated with the conventional techniques described previously, and provide improved security by requiring users to authenticate themselves to multiple authentication servers. Moreover, no modification of the applications or communication protocols is required. These and other features and advantages of the present invention will become more readily apparent from the accompanying drawings and the following detailed description.

DETAILED DESCRIPTION

Aspects of the present invention provide an authentication system where a one-time passcode generated by an authentication token is jointly authenticated by two or more independent servers. In the exemplary embodiment described herein, a one-time passcode is jointly authenticated by two independent servers, denoted "Blue" and "Red." The exemplary servers share distinct keys, respectively $k_{blue}$ and $k_{red}$, with the token. The exemplary keys, $k_{blue}$ and $k_{red}$, evolve over time, for example, by employing forward-secure pseudorandom generators. Each server independently authenticates the correctness of presented passcodes. Thus, even if one server is actively compromised, the combined passcode verification decision by both servers remains correct. Once one-time passcodes are disclosed and verified, they need not remain secret.

According to a further aspect of the invention, the exemplary Blue and Red servers periodically proactivize by mutually refreshing keys. Blue and Red periodically refresh their mutual states by sharing data derived from $k_{blue,t}$ and $k_{red,t}$. The (fixed-length) interval of time between one refresh and the next refresh is referred to as an epoch. Thus, periodically, such as once per epoch, the exemplary Blue server transmits some key material derived from its local state (for example, a hash of a key), that the exemplary Red server uses to update its own state, and vice versa. Thus, if an adversary compromises both servers, but does so in different epochs, the servers will still jointly verify passcodes correctly.

The present invention will be described herein with reference to an exemplary communication system in which a user device, referred to herein as a client-side computing device, communicates with an authentication authority and one or more additional entities, such as a protected resource. It is to be appreciated, however, that the invention is not restricted to use in this or any other particular system configuration.

Figure 1:
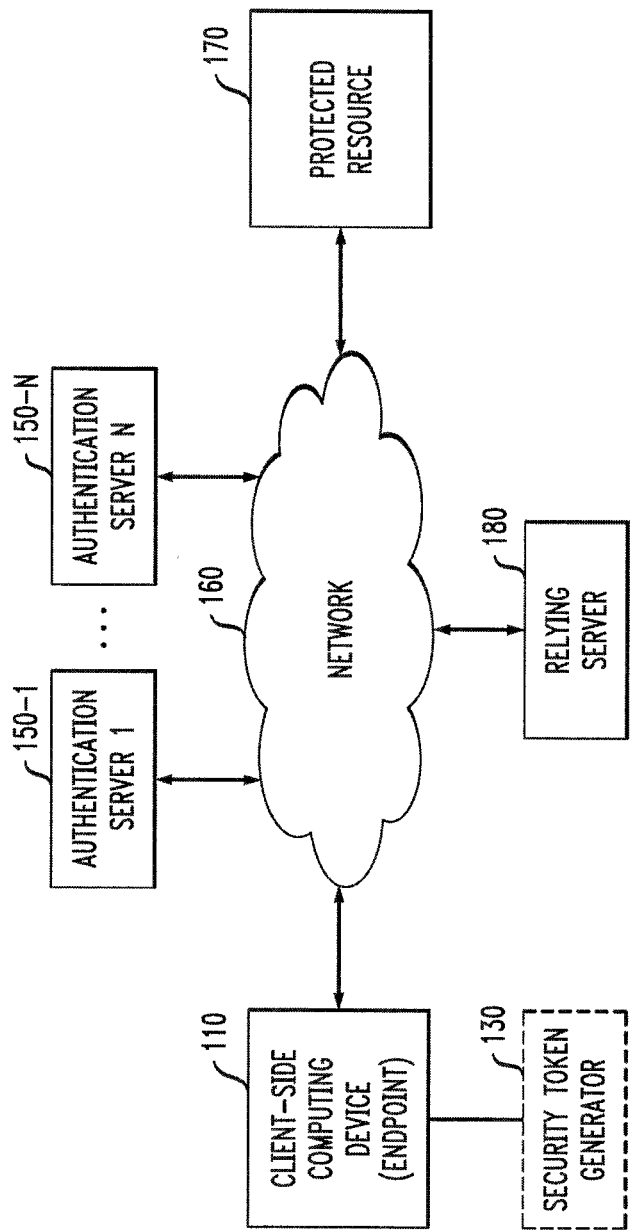
FIG. 1 illustrates an exemplary network environment in which the present invention can operate.

FIG. 1 illustrates an exemplary client-side computing device (CSCD) 110 communicating with a protected resource 170 over a network 160. In an exemplary implementation, the user must authenticate with a plurality of authentication servers 150-1 through 150-N (hereinafter, collectively referred to as authentication servers 150) using a token generated by a security token generator 130 (hereinafter, referred to as security token 130) before obtaining access to the protected resource 170. As indicated above, in the exemplary embodiment described herein, two exemplary authentication servers 150 are denoted "Blue" and "Red." The network 160, may comprise, for example, a global computer network such as the Internet, a wide area network (WAN), a local area network (LAN), a satellite network, a telephone or cable network, or various portions or combinations of these and other types of networks.

According to one aspect of the invention, the user of the CSCD 110 is jointly authenticated using a one-time passcode generated by the security token generator 130 by two or more authentication servers 150. The exemplary communications among the system elements 110, 130, 150, 170, 180 of FIG. 1 to achieve joint authentication by the authentication servers 150 is discussed further below in conjunction with FIGS. 2-4.

In the exemplary implementation, each authentication server 150 provides an authentication decision to an optional relying server 180. As discussed further below in conjunction with FIG. 2, the relying server 180 processes the authentication decision from each authentication server 150 and treats an authentication session as successful only if all servers 150 output an "accept" decision.

It is to be appreciated that a given embodiment of the disclosed system may include multiple instances of CSCD 110, security token 130 and protected resource 170, and possibly other system components, although only single instances of such components are shown in the simplified system diagram of FIG. 1 for clarity of illustration.

As used herein, the term "session" with a protected resource 170 shall mean an interactive information interchange between a CSCD 110 and the protected resource 170.

The security token 130 is shown in FIG. 1 as being separate from and electrically connected to the CSCD 110. The security token 130 may be implemented, for example, using the RSA SecurID® user authentication token commercially available from RSA Security Inc. of Bedford, Mass., U.S.A. The security token 130 may be a server or other type of module that is accessible over the network 160, or it may be a software component resident on the CSCD 110. As another alternative, token 130 may be distributed over multiple devices, one of which may be the CSCD 110. Thus, while the present invention is illustrated herein using a security token 130 electrically connected to the CSCD 110, such that the CSCD 110 can read a given token code (or another authentication value) directly from the token 130, other implementations are within the scope of the present invention, as would be apparent to a person of ordinary skill in the art. For example, for other security tokens 130 that are not connectable to a computer or other user device in this manner, the user may manually enter a password or another value displayed by the token 130 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

The authentication servers 150 are typically associated with a third party entity, such as an authentication authority, that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Figure 2:
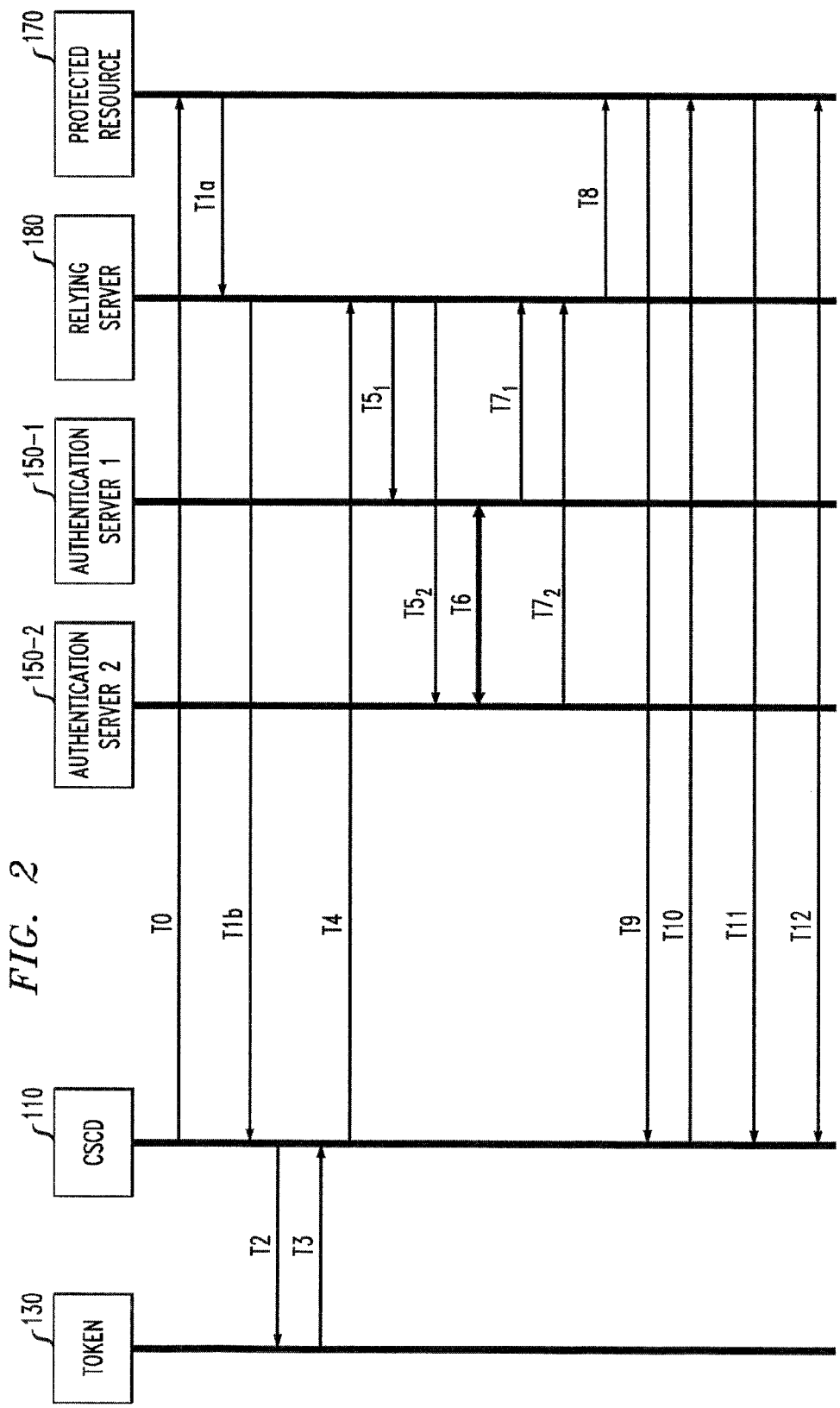
FIG. 2 illustrates an exemplary authentication process in accordance with the invention.

FIG. 2 illustrates communications among various system elements 110, 130, 150, 170, 180 of FIG. 1 at particular points in time, denoted T0 through T12, for an exemplary multi-server authentication process in accordance with the present invention. As shown in FIG. 2, at time T0, the CSCD 110 requests access to a protected resource 170. At time T1a, the protected resource 170 communicates with the relying server 180 to notify the relying server 180 about the pending request. At time T1b, the relying server 180 communicates with the CSCD 110 to request authentication information (e.g., a passcode comprised of the tokencode and a password or PIN)

from the CSCD 110. At times T2 and T3, the CSCD 110 obtains a portion of the authentication information from the exemplary token 130 (e.g., the tokencode) and combines it with authentication information of the user (e.g., a password or PIN).

At time T4, the CSCD 110 sends the authentication information (e.g., a passcode comprised of the tokencode and password) to the relying server 180. At time $T5_1$, the relying server 180 requests authentication server 150-1 to verify the passcode received from the CSCD 110 and at time $T5_2$, the relying server 180 requests authentication server 150-2 to verify the passcode received from the CSCD 110.

At time T6, the two exemplary authentication servers 150-1 and 150-2 communicate with one another based on one or more protocols discussed further below in conjunction with FIGS. 3 and 4. At time T7, the two exemplary authentication servers 150-1 and 150-2 provide their authentication decisions to the relying server 180. If both exemplary authentication servers 150-1 and 150-2 authenticate the CSCD 110, the relying server 180 will instruct the protected resource 170 to grant access to the CSCD 110 at time T8.

At time T9, upon verification of the authentication information by the authentication servers 150 (as confirmed by the relying server 180), the protected resource 170 grants the user of the CSCD 110 permission to gain access to the protected resource 170.

At time T10, the CSCD 110 optionally sends information (e.g., a proposed encryption protocol and shared key) to the protected resource 170. The transmitted information is optionally used to create a secure channel between the CSCD 110 and the protected resource 170, in a known manner. At time T11, the protected resource 170 sends a response (e.g., an acknowledgement) to the secure channel request. The communications of times T10 and T11 can be repeated, for example, if the protected resource 170 does not support the encryption protocol proposed by the CSCD 110, or the protected resource 170 otherwise requests an alternate encryption protocol.

At time T12, the secure channel is established using the agreed-upon authentication information and the shared keys exchanged at times T10 and T11.

Multi-Server Authentication Preliminaries The disclosed multi-server authentication scheme operates over cryptographic keys, from which passcodes are derived. Objects thus include:

Key space: $K=\{0,1\}^l$ denotes a key space under security parameter 1. For the symmetric-key operations in the exemplary scheme, an exemplary space of 128-bit bitstrings can be chosen, e.g., $K=\{0,1\}^{128}$.

Passcode group: P denotes the space of passcodes; P is a group under operator +. For the exemplary RSA SecurID® user authentication token, it is convenient to take $P=\{0, 1, \ldots, 9\}^d$, i.e., a set of decimal-digit strings, with + being digitwise addition modulo 10.

The exemplary functions are:

Passcode mapping: The function $g: K \times Z \rightarrow P$ is a one-way function that derives a passcode P from a key k and the current timestep $t \in Z$, the space of time values.

Commitment scheme: $w: K \times \{0,1\}^* $ denotes a computationally binding and hiding commitment function under witness k of a message m. This function w might be instantiated in practice by means of a hash function or as a block cipher under key k. Its output is commonly referred to as a blob.

For generality, and as some passcode security features, e.g., Funkspiel schemes, require keys to evolve in a forward-secure way. Let $k_{blue,t}$ and $k_{red,t}$ denote the respective keys of Blue and Red in timestep t. Keys may evolve between timesteps. See, for example, Johan Hastad et al., "Funkspiel Schemes: An Alternative to Conventional Tamper Resistance," CCS '00, Proc. of the 7th ACM conference on Computer and Communications Security, 125-133 (2000), incorporated by reference herein. Generally, Funkspiel schemes effectively permit only a one-time, one-bit message.

Adversarial Model

The exemplary scheme aims to protect against an adversary that fully compromises one authentication server 150, i.e., obtains complete, active control of the Blue or Red server 150. The adversary is also presumed to control one or more clients 110 in the system. The proactive variant of the exemplary scheme, as discussed further below, presumes an adversary that can compromise both servers 150, but only one in any given epoch.

In both models, the adversary is seeking to impersonate a user U, by intercepting a previous or the current authentication attempt by user U.

Multi-Server Authentication Protocol

Overview

Let $P_t \in P$ denote the (unique) valid passcode for the token T 130 at time t. This passcode is computed in the exemplary scheme as the combination of passcodes generated by the Blue and Red servers 150. In particular:

$$P_t = P_{blue,t} + P_{red,t},$$

where $P_{blue,t} = g(k_{blue,t})$ and $P_{red,t} = g(k_{red,t}, t)$.

In the authentication protocol, a client 110 (e.g., an application that requires user authentication) receives passcode $P'_t$ from a user, who transcribes it from T 130. The client 110 sends the candidate passcode $P'_t$ to one or both authentication servers 150, or to the relying server 180.

The task of the two exemplary authentication servers 150 is to jointly determine whether $P'_t = P_t = P_{blue,t} + P_{red,t}$, i.e., whether the presented passcode is valid. As discussed further below in conjunction with FIG. 2, the Blue and Red servers 150 make this determination jointly by exchanging their respective passcode shares.

However, if one naively implements this joint computation, by having one authentication server 150, say Blue, merely sending its shared passcode, $P_{blue,t}$, to the other authentication server 150, say Red, then a direct impersonation attack is unavoidable. For instance, the malicious receiving server 150, Red, can fake a verifying authentication attempt by submitting passcode $P_{blue,t} + P_{red,t} - P'''$, for any $P'''$, and using a fake Red share $P_{red,t} - P'''$.

A key element, thus, of the exemplary protocol that prevents impersonation via server manipulation of partial passcodes is a commitment of partial passcodes by the authentication server 150 that initiates the exchange. Without this commitment phase, the authentication server 150 that first receives partial passcodes could exploit them to impersonate the user 110, as detailed below.

Multi-Server Authentication Protocol

Let s be a unique session identifier that includes UID, the identity of the user, as well as the authentication time t.

Assume without loss of generality that the Blue server 150 initiates the protocol between the authentication servers 150. A receive function imports a passcode and session identifier into an authentication session. An output function exports an authentication decision for consumption by a relying server 180, discussed further below in a section entitled "Server Outputs and the Relying Server." A verify function determines, given reconstructed passcode $P_t$, whether the submitted passcode $P'_t$ is correct. The exemplary verify function outputs a binary decision, either "accept" or "reject." If any equality test ($\stackrel{?}{=}$) fails, then an authentication server 150 outputs "reject" immediately (and indicates its decision to the other authentication servers 150 and/or the relying server 180).

Figure 3:
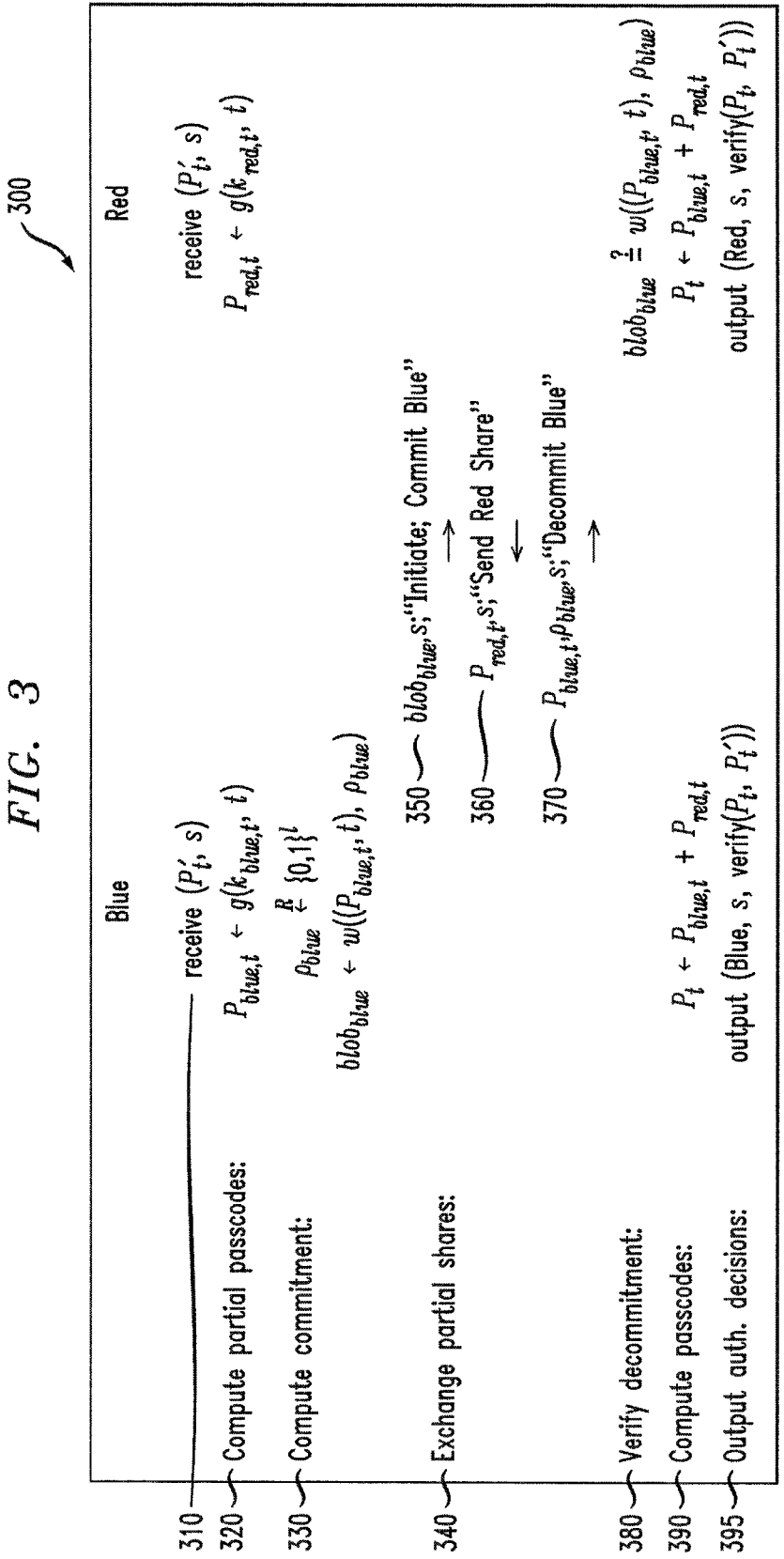
FIG. 3 is pseudo-code for an exemplary multi-server authentication process that incorporates aspects of the present invention.

FIG. 3 is pseudo-code for an exemplary multi-server authentication process 300 that incorporates aspects of the present invention. As shown in FIG. 3, the Blue and Red authentication servers 150 initially receive the submitted passcode ($P'_t$, s) for the session from the relying server 180 during step 310 (times $T5_1$ and $T5_2$ in FIG. 2). Thereafter, the Blue and Red authentication servers 150 compute partial passcodes during step 320, as follows:

$P_{blue,t} \leftarrow g(k_{blue,t}, t)$; and
$P_{red,t} \leftarrow g(k_{red,t}, t)$.

As discussed above, a commitment is computed by the initiating authentication server 150, such as the Blue server 150, during step 330, as follows:

$\rho_{blue} \stackrel{R}{\leftarrow} \{0,1\}^l$
$blob_{blue} \leftarrow w((P_{blue,t}, t), \rho_{blue})$ Generally, as discussed further below in the section entitled "Why Commitment is Recommended," the commitment can be considered a secure envelope. The value $\rho_{blue}$ is a secret key that is used to protect the secure envelope. The entity that seals the secure envelope (i.e., the initiating authentication server 150) must provide $\rho_{blue}$ to unlock the envelope. The entity that seals the secure envelope is said to commit to the contents when the envelope is sealed. As indicated above, the function w denotes a computationally binding and hiding commitment function, such as, for example, a hash function or as a block cipher. Its output is commonly referred to as $blob_{blue}$.

The two authentication servers 150 exchange partial shares during step 340. In particular, during step 350 the initiating authentication server 150 (Blue) sends the following exemplary commitment message to the second authentication server 150 (Red) during step 350:

$blob_{blue}$, s; "Initiate; Commit Blue"

The second authentication server 150 (Red) then replies during step 360 by sending the initiating authentication server 150 (Blue) the following partial share in the clear:

$P_{red,t}$, s; "Send Red Share"

The initiating authentication server 150 (Blue) then sends a decommit message in the clear during step 370:

$P_{blue,t}, \rho_{blue}$, s; "Decommit Blue"

The second authentication server 150 (Red) then verifies the decommitment during step 380 by evaluating the following expression:

$blob_{blue} \stackrel{?}{=} w((P_{blue,t}, t), \rho_{blue})$

Both authentication servers 150 (Blue and Red) compute the passcodes as a sum of the two partial passcodes during step 390, as follows:

$P_t \leftarrow P_{blue,t} + P_{red,t}$

Finally, the two authentication servers 150 (Blue and Red) output the generated authentication decisions during step 395, as follows:

Blue outputs (Blue, s, verify ($P_t, P'_t$)); and
Red outputs (Red, s, verify ($P_t, P'_t$)).

Discrete Time t. It is noted that time t in the exemplary multi-server authentication process 300 of FIG. 3 is not meant to be a continuous actual time value, but it rather refers to a discrete value that specifies an elementary time unit, for instance, one minute. In other words, the actual time of each of the servers 150 is truncated to the corresponding (closest) such elementary time unit. Therefore, possible clock drifting between the times of the two servers 150 does not affect the correctness of the exemplary multi-server authentication process 300.

Auxiliary Information Via Codebooks.

In the exemplary multi-server authentication process 300, the verify function might simply perform an equality test $P'_t \stackrel{?}{=} P_t$. In one variant, however, a verification of the form $P'_t \stackrel{?}{=} P_t + c$ can take place, where c is a codeword drawn from a token-specific and possibly time-varying codebook $C_t$; in this case, c encodes some auxiliary information. The two servers in this case verify that there is a valid codeword $c \in C_t$ satisfying $P'_t = P_t + c$.

Securing Against Replay Attacks.

The exemplary multi-server authentication process 300 assumes that both servers receive ($P_t$, s) substantially simultaneously, due to direct communication with both servers 150 by the client 110 or by a relying server 180. If the passcode is sent to only one server 150, such as the Blue server, and then passed along to the other server 150, such as the Red server, then the authentication system becomes vulnerable to a replay attack. The Blue server 150 can suppress session s, create a new session s' for the same user on a different client 110, and replay $P_t$ under the new session identifier. At a minimum, therefore, both servers 150 and/or the relying server 180 must be aware of an authentication attempt by a given user UID in a given timestep t and deny duplicate authentication attempts.

Securing Server Outputs.

The server outputs can be authenticated (and potentially encrypted) as would be apparent to a person of ordinary skill in the art. The servers 150 might, for example, maintain Transport Layer Security (TLS) connections to a relying server 180.

Why Commitment is Recommended.

As mentioned above, commitment prevents impersonation attacks by one corrupted server 150. Suppose, for example, that the Blue server didn't commit, but sent its shares in the clear in the first protocol flow. Then, the Red server could impersonate the user 110 as follows. The Red server selects a random, bogus passcode $\tilde{P}_t \in P$, and submits it from a client 110 under its control. On receiving $P_{blue,t}$, Red sends $\tilde{P}_{red,t} = \tilde{P}_t - P_{blue,t}$ to Blue. The fact that the commitment hides Blue's partial passcode prevents this attack. The fact that the commitment is binding prevents Blue from mounting a similar impersonation attack against Red.

Defeating Passcode Re-Entry Attacks

Another aspect of the invention protects against exploiting an authorized user being rejected. For example, the Red server can deny access to an authorized user and use the transaction to obain important information from the Blue server. In particular, passcode reassembly may expose the system to a passcode re-entry attack. SecurID authentication servers 150 may allow a user to make multiple passcode entry attempts within a given one-minute window. Thus, an attacker that has compromised one server 150 (say, Blue) can breach a system with the basic protocol above as follows: (1) Impersonate a user and enter an incorrect passcode P* for time t; (2) Learn the correct value $P_t$ in Blue when P* is checked (and rejected), and re-submit $P_t$ to impersonate the user. This problem is exacerbated by the fact that authentication servers 150 check passcodes across multiple time-windows, thereby disclosing them to the two exemplary servers 150. Alternatively, a malicious server 150, say Blue, may perform a similar password re-entry attack by simply reporting (i.e., committing to) an incorrect $P_{blue,t}$ partial passcode, thus forcing the exemplary multi-server authentication process 300 to fail, but learning at the same time the correct $P_{red,t}$ partial passcode coming from the other server 150. This attack is referred to as bogus-commit passcode re-entry attack, as discussed further below in the section entitled "Defeating Bogus-Commit Passcode Re-Entry Attacks."

Thus, another aspect of the invention provides a modified protocol, discussed further below in conjunction with FIG. 4, that helps protect against this attack, by disclosing passcodes progressively. That is, authentication servers 150 jointly compute and verify a portion of the passcode $P_t$ for a given time t. Only if the submitted passcode agrees with this portion are further portions jointly computed by the servers.

The same technique of progressive disclosure can be applied to the codebook $C_t$, provided that the codebook, like the passcodes, is also itself composed of Red and Blue halves, and codeword digits can be revealed individually.

Figure 4:
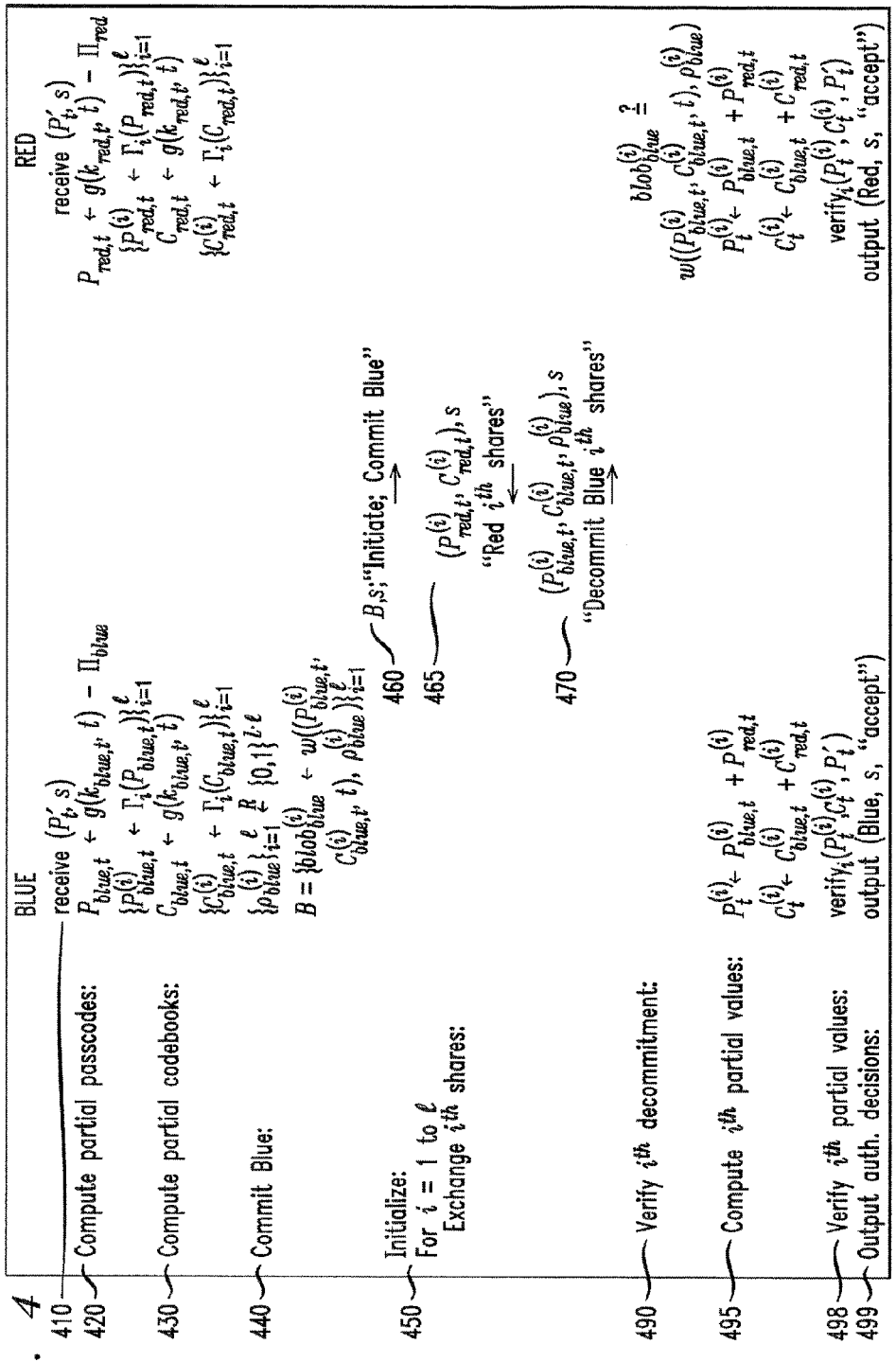
FIG. 4 is pseudo-code for an exemplary progressive disclosure multi-server authentication process.

FIG. 4 is pseudo-code for an exemplary multi-server authentication process 400 that incorporates a progressive disclosure aspect of the present invention. Generally, the exemplary multi-server authentication process 400 provides an l-stage verification protocol. As shown in FIG. 4, the exemplary Blue and Red authentication servers 150 initially receive the submitted passcode (P'$_t$, s) for the session from the relying server 180 during step 410 (times T5$_1$ and T5$_2$ in FIG. 2). Thereafter, the Blue and Red authentication servers 150 compute partial passcodes during step 420, as follows:

$P_{blue,t} \leftarrow g(k_{blue,t}, t) - \pi_{blue}$ and $\{P_{blue,t}^{(i)} \leftarrow \Gamma_i(P_{blue,t})\}_{i=1}^{l}$; and $P_{red,t} \leftarrow g(k_{red,t}, t) - \pi_{red}$ and $\{P_{red,t}^{(i)} \leftarrow \Gamma_i(P_{red,t})\}_{i=1}^{l}$.

where the function $\Gamma_i(P)$ outputs the $i^{th}$ "segment" of P, for $1 \leq i \leq l$. For example, in a two-stage protocol that separately verifies the left and right halves of a passcode, $\Gamma_1(P)$ can denote the left half (e.g., left four digits of an eight-digit passcode) of a passcode, while $\Gamma_2(P)$ can denote the right half. The exemplary computed partial passcodes also incorporate the user's PIN $\pi$. $\pi$ is presumed to have been split randomly upon registration of the user 110 such that $\pi = \pi_{blue} + \pi_{red}$, where $\pi_{blue}$, $\pi_{red}$ are secretly kept by server Blue and Red, respectively. It is also presumed here that $\pi$ is added digitwise (mod 10) to the token-displayed passcode prior to transmission.

The Blue and Red servers 150 compute partial codebooks during step 430, as follows:

$C_{blue,t} \leftarrow g(k_{blue,t}, t)$ and $\{C_{blue,t}^{(i)} \leftarrow \Gamma_i(C_{blue,t})\}_{i=1}^{l}$; and
$C_{red,t} \leftarrow g(k_{red,t}, t)$ and $\{C_{red,t}^{(i)} \leftarrow \Gamma_i(C_{red,t})\}_{i=1}^{l}$.

where $\Gamma_i(C)$ denotes the $i^{th}$ segment of a codebook C.

In an exemplary embodiment, the Blue server 150 is the server that commits during step 440, as follows:

$\{\rho_{blue}^{(i)}\}_{i=1}^{n} \xleftarrow{R} \{0,1\}^{l \cdot l}$ $B = \{blob_{blue}^{(i)} \leftarrow w((P_{blue,t}^{(i)},$ $C_{blue,t}^{(i)}, t), t), \rho_{blue}^{(i)})\}_{i=1}^{l}$ where the variables and functions are as defined above for the commitment of FIG. 3.

During step 450, the Blue server 150 enters a loop to exchange the $i^{th}$ partial share, as follows. During step 460, the Blue server 150 sends a commitment message to the Red server 150, as follows:

B, s; "Initiate; Commit Blue"

The second authentication server 150 (Red) then replies during step 465 by sending the initiating authentication server 150 (Blue) the following $i^{th}$ partial share in the clear:

$(P_{real,t}^{(i)}, C_{red,t}^{(i)})$, s and "Red $i^{th}$ shares".

The initiating authentication server 150 (Blue) then sends a decommit message for the $i^{th}$ partial share in the clear during step 470:

$(P_{blue,t}^{(i)}, C_{blue,t}^{(i)}, \rho_{blue}^{(i)})$, s and "Decommit Blue $i^{th}$ shares"

The second authentication server 150 (Red) then verifies the $i^{th}$ decommitment during step 490 by evaluating the following expression:)

$blob_{blue}^{(i)} \stackrel{?}{=} w((P_{blue,t}^{(i)}, C_{blue,t}^{(i)}, t), \rho_{blue}^{(i)})$ Both authentication servers 150 (Blue and Red) compute the $i^{th}$ partial values as a sum of the two $i^{th}$ partial passcodes during step 495, as follows:

$P_t^{(i)} \leftarrow P_{blue,t}^{(i)} + P_{red,t}^{(i)}$ and $C_t^{(i)} \leftarrow C_{blue,t}^{(i)} + C_{red,t}^{(i)}$; and $P_t^{(i)} \leftarrow P_{blue,t}^{(i)} + P_{red,t}^{(i)}$ and $C_t^{(i)} \leftarrow C_{blue,t}^{(i)} + C_{red,t}^{(i)}$ Both authentication servers 150 (Blue and Red) verify the $i^{th}$ partial values during step 498, as follows:

$verify_i(P_t^{(i)}, C_t^{(i)}, P'_t)$ where the function $verify_i$ here takes as input submitted P'$_t$, and respective passcode and codebook segments $P_t^{(i)}$ and $C_t^{(i)}$.

Finally, the two authentication servers 150 (Blue and Red) output the generated authentication decisions during step 499, as follows:

Blue outputs (Blue, s, "accept"); and
Red outputs (Red, s, "accept").

The two authentication servers 150 (Blue and Red) output either "accept" or "reject."

Defending Against Progressive Re-Entry Attack.

An attacker that has compromised one server 150 can still mount a re-entry attack against this enhanced protocol. If the attacker has compromised Blue, for instance, the attacker can submit an incorrect passcode on behalf of the target user. This will cause $P_{red,t}^{(1)}$ to be revealed to the Blue server 150 during the progressive-disclosure multi-server authentication process 400. The attacker can subsequently therefore re-enter a passcode on behalf of the user with a correct segment $P_t^{(1)}$, causing $P_{red,t}^{(2)}$ to be revealed, etc., until the attacker learns and submits a correct passcode $P_t$. To prevent this attack, the servers should reject all subsequent authentication attempts for time t once segment $P_t^{(j)}$ has been revealed (during a rejected authentication attempt).

Stronger Protection Against Passcode Re-Entry Attacks

An ever stronger approach than progressive disclosure of the exemplary multi-server authentication process 400 is a protocol in which servers 150 don't explicitly reveal passcodes to one another. Instead, they use a minimum-knowledge equality testing protocol, such as that described in J. Brainard et al., "A New Two-Server Approach for Authentication With Short Secrets," USENIX Security (2003); or Michael Szydlo and Burton Kaliski, "Proofs for Two-Server Password Authentication," Topics in Cryptology, CT-RSA 2005, Vol. 3376 of Lecture Notes in Computer Science, 227-44, (2005), each incorporated by reference herein. The drawback to this approach is that it requires each server 150 to perform several modular exponentiations, and thus substantially more computation than in a purely symmetric-key approach.

Suppose, for example, that there is no codebook $C_t$. Then the Blue server 150, for instance, can compute $P'_{red,t} = P'_t - P_{blue,t}$, while the Red server 150 computes $P_{red,t}$. The two servers 150 then perform an interactive equality test to determine whether their locally computed values are equal. As this test doesn't reveal any additional information, it provides strong protection against passcode re-entry attacks.

This approach also works in the case where there is a codebook $C_t$, i.e., where a correct passcode is of the form $P'_t = P_t + c$ for some $c \in C_t$. But in this case, the two servers 150 must perform a brute-force search of the codebook. In particular, for every $c \in C_t$, the Blue server 150 can compute $P'_{red,t} = P'_t - P_{blue,t} - c$; the two servers 150 can then perform an equality test.

Detection-Based Defense Mechanism Against Passcode Re-Entry Attacks

In the case where a codebook $C_t$ is used to embed a codeword c into the passcode $P_t$, i.e., where the verification test amounts to checking whether $P'_t \stackrel{?}{=} P_t + c$ for some $c \in C_t$, it is possible to implement a simple detection-based defense mechanism against re-entry attacks. This mechanism can be applied either as is in the exemplary multi-server authentication process 300 of FIG. 3 or as a defense mechanism that augments the mechanism of the progressive-disclosure multi-server authentication process 400 of FIG. 4 or the explicit-equality-text extended protocol, discussed above.

The main observation, here, is that any failed verification at the server 150 in an authentication attempt by a legitimate user must be due to mistyping, i.e., the user submits a $P'_t$ that is very close to, but not equal to, $P_t + c$ (or otherwise the legitimate user has absolutely no reason not to provide to the client application the correct passcode). Instead, an attempted passcode re-entry attack must rely on a randomly guessed passcode $P^*$. The idea is then to make use of the appropriate codebook $C_t$ so that server-side detection of "far" verification failures (due to randomly chosen attack passcodes) is possible, distinguishing them from "near" verification failures (due to mistyped, thus close-but-not-equal or near-miss, submitted passcodes).

By choosing $C_t$ to be an error-detection code, it can be ensured that any pair of codewords in $C_t$ is guaranteed to have a sufficiently large minimum Hamming distance. Then, whenever an authentication failure occurs at the servers protocol, that is, it is found that $P'_t \neq P_t + c$ or $P'^{(i)}_t \neq P^{(i)}_t + c_i$, where $c \in C_t$ or $c_i \in C_t^{(i)}$ (i.e., c is the ith portion of codeword $c \in C_t$) and $P'^{(i)}_t$ is the ith portion of $P'_t$, then the server 150 tries to detect whether this is a "far" or "near" failure. To do this, the server needs to compute the minimum distance of $D = P'_t - P_t$ or $D_i = P'^{(i)}_t - P^{(i)}_t$ respectively to any $c \in C_t$ or to the ith portion $c_i$ of any $C \in C_t$, and if this distance D or $D_i$ is below a certain "mistyping" threshold value, then the failure is marked as "near," otherwise as "far." When a failure is of the latter form, then this is deemed as a suspicious event or warning and the server no longer accepts authentication in the same elementary time unit t.

Server Outputs and the Relying Server

The joint authentication decision of the Blue and Red servers 150 consists of their combined outputs. That is, a relying server 180 consumes the outputs of both servers 150 and treats an authentication session s as successful only if both servers 150 output "accept."

Integrity protection on communications between the Blue and Red servers 150 and the relying server 180 is important to ensure that the relying server 180 consumes valid authentication decisions. (Confidentiality may also be important in some settings.)

Use of a secure channel, e.g., use of TLS, between the servers 150 and relying server 180 offers such protection. To achieve systemic protection against compromise of the relying server 180 itself, however, a preferable alternative may be for servers 150 to digitally sign their outputs. The relying server 180 then obtains proof of an authentication decision, and cannot misrepresent it to another party.

Usage of Auxiliary Information.

The verify function yields a binary authentication decision, either "accept" or "reject." A passcode may carry additional information by including a codeword c drawn from a codebook $C_t$. To render an "accept"/"reject" decision, the verify function should determine whether $P'_t - P_t \in C_t$, i.e., if $P'_t$ encodes a valid codeword. Blue and Red servers 150 might also locally consume the auxilliary information contained in c and either pass it on directly to the relying server 180, or implement security policies locally based on this information.

Hiding the Codebook $C_t$.

An alternative architecture is possible in which Blue and Red servers 150 can verify whether passcodes are valid, but can't decode messages in the auxilliary channel. This alternative is attractive because auxilliary-channel messages may carry, e.g., indications that Blue and/or Red servers 150 have been breached. Such a scheme is possible when the mapping $f: M \to Z_l$ of an auxilliary-channel message m into the codebook $C_t$ (where $|C_t|=1$) is time-varying. For instance, every time step t might have a distinct, secret, associated mapping $f_t$. In particular, this secret mapping $f_t$ may be pseudorandomly defined/generated on a per-passcode transmission basis using an individual corresponding seed $s_f$ that is known only to the token and the relying server 180. In this case, the token can share $f_t$ (through $s_f$) with the relying server, while $f_t$ remains unknown to the servers. Blue and Red servers 150 can then determine whether a presented codeword c is valid, i.e., whether $C \in C_t$, but can't decode messages in the auxilliary channel.

Achieving Proactive Security

According to another aspect of the invention, proactive security may be achieved through periodic "cross pollination" of key state between the Blue and Red servers 150 in every timestep t marking the beginning of an epoch.

Let h1, h2: $K \to K$ and h3, h4: $K \times K \to K$ be one-way functions, e.g., cryptographic hash functions. Then, the Blue and Red servers 150 do the following:

1. Blue computes $k^*_{blue,t} = h1(k_{blue,t})$; Red computes $k^*_{red,t} = h2(k_{red,t})$.
2. Blue and Red exchange $k^*_{blue,t}$ and $k^*_{red,t}$.
3. Blue performs the update $k_{blue,t} \leftarrow h3(k_{blue,t} \| k^*_{red,t})$ and Red performs the update $k_{red,t} \leftarrow h4(k_{red,t} \| k^*_{blue,t})$ Let $\Delta$ denote the length of an epoch. Thus timesteps in $[0, \Delta-1]$ constitute the first epoch in the system, those in $[\Delta, 2\Delta-1]$ the second, and so forth. Suppose that "cross pollination" occurs just prior to the start of an epoch. Given the proactive scheme described above, then, an attacker that compromises the Blue server 150 transiently in epoch j, i.e., within the period $[j\Delta, (j+1)\Delta-1]$, i.e., loses control of the Blue server 150 within the epoch, cannot feasibly compute $k_{blue,t}$ for any t in epoch j+1. Consequently, even if the Red server 150 is compromised in epoch j+1, it will be unable to impersonate a user.

Interface with Foward-Secure Pseudo-Random Number Generation.

As noted above, it is useful for $k_{blue,t}$ and $k_{red,t}$ to evolve in a forward-secure way. In this case, $k_{blue,t}$ and $k_{red,t}$ are the internal states of a forward-secure pseudo-random number generator (FS-PRNG). The FS-PRNG may be implemented, for example, in accordance with the teachings of U.S. patent application Ser. No. 13/334,709, filed Dec. 22, 2011, entitled "Methods and Apparatus for Generating Forward Secure Pseudorandom Numbers," (now U.S. Pat. No. 9,008,393), incorporated by reference herein.

Using hierarchical hashing DAGs, it is possible to organize the forward-secure derivation and cross pollination of these keys in such a way so that the following two seemingly contradicting goals are satisfied: (1) the Red and Blue servers 150 can quickly compute the current corresponding keys $k_{blue,t}$ and $k_{red,t}$ without having to reconstruct all previous such keys for time t'<t; and at the same time (2) the cross pollination of keys, defined through functions h1, h2, h3, h4, forms a continuous interleaved hash chain of internal states of the FS-PRNG such that the above property (i.e., the attacker cannot impersonate a user) is achieved.

Token-Side Key Updates.

Similar cross-pollinated state updates to keys $k_{blue,t}$ and $k_{red,t}$ must, of course, be computed locally within passcode tokens.

Multiple Keys.

In the case where $k_{blue,t}$ and $k_{red,t}$ are PRNG states, they may comprise multiple keys, i.e., $k_{blue,t} = \{k_{blue,t}^{(i)}\}_{i=1}^{n}$ (and likewise for $k_{red,t}$). In this case, the full state may be hashed to derive $k^*_{blue,t}$ (respectively, $k^*_{red,t}$), i.e., the hash function h1 operates over domain $K^n$. Similarly, h3 may be replaced with a suite of functions $\{h3^{(i)}\}$ over domain $K^2$ such that $k_{blue}^{(i)} \leftarrow h3^{(i)}(k_{blue,t(i)} \| k^*_{red,t})$. (Operations in Red are analogous.)

For a discussion of distributed PRNG, see, for example, R. Canetti and A. Herzberg, "Maintaining Security in the Presence of Transient Faults," CRYPTO, 425-38 (1994), where keys are combined via XOR (and doesn't contemplate interfacing with a foward-secure PRNG).

Defeating Bogus-Commit Passcode Re-Entry Attacks

Bogus-commit passcode re-entry attacks are inherent in the two-party joint verification protocols disclosed herein, since any server may simply report incorrect partial secrets (passcodes), and thus make the current verification fail, thereby providing an opportunity to perform a passcode re-entry attack (since the server 150 learns the other half of the passcode). According to a further aspect of the invention, a countermeasure is provided against this type of attack. Each server 150, say Blue, can store the verification values (that is, the partial passcodes after their decommitment) sent by the other server, Red, and make sure they're consistent from session to session with the same UID.

Alternative Version Via Key-Level Verification

The embodiments discussed above split and verify the authentication secret information at the passcode level, that is, the passcode $P_t$ is viewed as:

$$P_t = P_{blue,t} + P_{red,t}$$

where each of the two partial passcodes, $P_{blue,t}$ and $P_{red,t}$ is derived by a secret key, respectively $k_{blue,t}$ and $k_{red,t}$ through function g.

The splitting and verification of the secret information can also occur at the key level, that is, the exemplary multi-server authentication process 300 and exemplary multi-server authentication process 400 in FIGS. 3 and 4, can be modified in order to compute and verify that the common key $k_t$ (which is itself used to verify the submitted passcode $P'_t$) is of the form:

$$k_t = k_{blue,t} + k_{red,t}$$

This alternative extension of the disclosed two-party verification protocols may lead to important performance efficiencies, for instance, because less surface area is used in a hardware token in order to compute the passcodes $P_t$ (since only one and not two application of function g is required).

Narrowing the Window for Direct Impersonation Attacks.

As discussion above in the section entitled "Achieving Proactive Security," in some cases, keys $k_{blue,t}$ and $k_{red,t}$ are PRNG states comprising a set of keys, i.e., $k_{blue,t} = \{k_{blue,t}^{(i)}\}_{i=1}^{n}$ (and likewise for $k_{red,t}$). Typically, each such individual key $k_{blue,t}^{(i)}$ may, for instance, be used to derive a separate passcode $P_t^{(i)}$ that is valid only for the ith first 1/n portion of the elementary time unit t. In this case, key-level verification, either directly through the exemplary multi-server authentication process 300 of FIG. 3 or progressively through the exemplary multi-server authentication process 400 of FIG. 4, may lead to increased opportunities for direct impersonation attacks: Indeed, at the end of the protocol, the Red server 150 learns $k_{blue,t}$, i.e., all n Blue keys corresponding to time unit t and vice versa, the Blue server 150 learns all Red keys for time t. Therefore, a compromised server 150 may perform a simple impersonation attack by first computing a valid but currently unused passcode $P_t^{(i)}$ that is derived (through function g) by the pair of keys $k_{blue,t}^{(i)}$, $k_{red,t}^{(i)}$, for some $i \in \{1, \ldots, n\}$, and then directly using this passcode to impersonate the victim user. In this case, a malicious server may obtain up to n−1 passcodes for launching a direct impersonation attack in a window of size up to t−1.

In one variation, the exemplary multi-server authentication process 300 can be extended to reduce the attack window significantly. The main idea, here, is to avoid the complete release of the entire state $k_{blue,t}^{(i)} = \{k_{blue,t}^{(i)}\}_{i=1}^{n}$ (and similar complete release of the Red equivalent key) at some time within time unit t, but instead make use of nested derivations of passcodes from these secret keys and selective release of the n secret keys $k_{blue,t}^{(i)}$, $1 \leq i \leq n$. In particular, passcode derivation can be performed as follows: The first pair of keys $k_{blue,t}^{(1)}$, $k_{red,t}^{(1)}$ are used to derive the first passcode $P_{t(1)}$ of the time unit t, as $P_t^{(1)} = g((k_{blue,t}^{(1)} + k_{red,t}^{(1)}), (t,1))$, but also to produce a sequence of n−1 unpredictable values $r = (r_t^{(2)}, r_t^{(3)}, \ldots, r_t^{(n)}) = h(k_{blue,t} + k_{red,t})$ using a one-way function h: $K \rightarrow \{0,1\}^{l \times (n-1)}$. Then, the ith passcode $P_t^{(i)}$ in time unit t is derived as $P_t^{(i)} = g(g((k_{blue,t}^{(i)} + k_{red,t}^{(i)}), r_t^{(i)}), (t,i))$, i.e., using a two-level hashing so that $P_t^{(i)}$ depends also on $r_t^{(i)}$. Moreover, at the ith 1/n portion of time unit t, the corresponding keys $k_{blue,t}^{(i)}$, $k_{red,t}^{(i)}$ are released selectively as follows: First, the keys $k_{blue,t}^{(i)}$, $k_{red,t}^{(i)}$ are released (using one of the processes 300, 400 of FIG. 3 or 4); then, if i>1, the keys $k_{blue,t}^{(i)}$, $k_{red,t}^{(i)}$ are released (again using one of the processes 300, 400 of FIG. 3 or 4).

Figure 5:
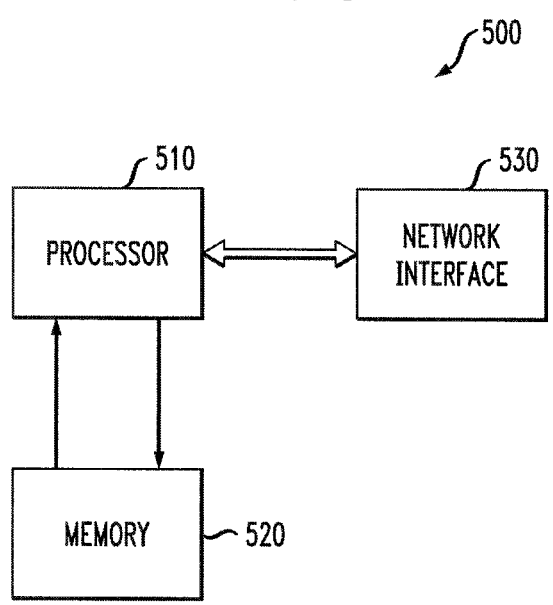
FIG. 5 illustrates one possible implementation of a given client-side computing device, authentication authority, protected resource, relying server or another processing device of the exemplary network environment of FIG. 1.

FIG. 5 shows one possible implementation of a given processing device 500 of the FIG. 1 system. The processing device 600 as shown may be viewed as representing, for example, CSCD 110, security token 130, authentication servers 150, protected resource 170 and relying server 180. The processing device 600 in this implementation includes a processor 510 coupled to a memory 520 and a network interface 530. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 520 and executed by the corresponding processor 510. The memory 520 is also used for storing information used to perform computations or other operations associated with the disclosed authentication on techniques.

As mentioned previously herein, the above-described embodiments of the invention are presented by way of illustrative example only. Numerous variations and other alternative embodiments may be used. For example, while the invention has been illustrated using two (Blue and Red) exemplary authentication servers 150, the invention may be extended into a k-out-of-N framework, ensuring security against an adversary capable of compromising up to k of N in total authentication servers 150 in any epoch. In addition, given sufficient bandwidth from tokens 130 to authentication servers 150, tokens 130 can transmit the result of public-key operations. An alternative design then becomes possible in which the token 130 interacts independently with each authentication server 150 using a distinct public-key certificate.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. In particular, aspects of the present invention provide improved security by requiring users to authenticate themselves multiple times using different authentication information over the course of a session. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of time-varying credentials or authentication information, rather than just token codes, and other types of access-controlled resources. Also, the particular configuration of system elements shown in FIGS. 1 and 5, and their interactions as shown in FIGS. 4 and 5, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authenticating a user, the method comprising steps of:
   receiving authentication information from the user; and
   authenticating the user based on the received authentication information using at least two authentication servers, wherein the received authentication information is based on a secret shared between a security token associated with the user and an authentication authority that provides the at least two authentication servers, wherein said step of authenticating the user further comprises at least a first one of said authentication servers computing at least one intermediate value as a function of a symmetric secret key and wherein said first one of said authentication servers (i) stores said at least one intermediate value as at least one intermediate state, and (ii) processes said at least one intermediate value for transmission to a second one of said authentication servers.

2. The method of claim 1, wherein the authentication information comprises a passcode comprised of a tokencode from the security token and a password from the user.

3. The method of claim 2, wherein the tokencode comprises a one-time passcode generated by the security token.

4. The method of claim 3, wherein said one-time passcode is based on a secret key that evolves over time in a forward-secure manner.

5. The method of claim 4, wherein said secret key is split into at least two partial keys.

6. The method of claim 5, wherein each of said partial keys comprises a partial state comprised of one or more elementary secrets.

7. The method of claim 5, wherein a partial key of a first authentication server is periodically updated by applying a function to a partial key of a second authentication server.

8. The method of claim 3, wherein said one-time passcode embeds auxiliary information using one or more codewords.

9. The method of claim 1, wherein the at least two authentication servers communicate with one another during a commitment phase.

10. The method of claim 9, wherein the at least two authentication servers each generate a partial passcode, wherein at least a first authentication server computes a commitment value and transmits said commitment value to a second authentication server and wherein said at least two authentication servers exchange the partial passcodes.

11. The method of claim 10, wherein the at least two authentication servers each generate a passcode computed as a combination of partial passcodes.

12. The method of claim 10, wherein the at least two authentication servers progressively send said partial passcodes over a plurality of stages.

13. The method of claim 9, wherein the at least two authentication servers each generate a partial passcode, wherein at least a first authentication server transmits a commitment value to a second authentication server and wherein said at least two authentication servers exchange the partial keys.

14. The method of claim 1, wherein the user is authenticated only if all of the at least two authentication servers authenticate the received authentication information.

15. The method of claim 1, wherein one or more of the steps are performed by a relying server.

16. The method of claim 1, wherein one or more of the steps are performed by an authentication server.

17. The method of claim 1, wherein the requesting step is responsive to a request to access a protected resource from the user.

18. The method of claim 17, wherein the protected resource comprises one or more of an application, web site or hardware device.

19. The method of claim 1, further comprising a step of associating a session identifier with said received authentication information.

20. The method of claim 1, further comprising a step of distinguishing between a mistyped passcode and a random passcode.

21. The method of claim 1, wherein the authentication information is processed by said at least two authentication servers at a key level using one or more partial keys.

22. The method of claim 21, wherein the one or more partial keys are progressively released by said at least two authentication servers.

23. An apparatus for authenticating a user, the apparatus comprising:
a memory; and
at least one hardware device, coupled to the memory, operative to implement the following steps:
receiving authentication information from the user; and
authenticating the user based on the received authentication information using at least two authentication servers, wherein the received authentication information is based on a secret shared between a security token associated with the user and an authentication authority that provides the at least two authentication servers, wherein said authentication of the user further comprises at least a first one of said authentication servers computing at least one intermediate value as a function of a symmetric secret key and wherein said first one of said authentication servers (i) stores said at least one intermediate value as at least one intermediate state, and (ii) processes said at least one intermediate value for transmission to a second one of said authentication servers.

24. The apparatus of claim 23, wherein the authentication information comprises a passcode comprised of a tokencode from the security token and a password from the user.

25. The apparatus of claim 24, wherein the tokencode comprises a one-time passcode generated by the security token.

26. The apparatus of claim 25, wherein said one-time passcode is based on a secret key that evolves over time in a forward-secure manner.

27. The apparatus of claim 25, wherein said one-time passcode embeds auxiliary information using one or more codewords.

28. The apparatus of claim 23, wherein the at least two authentication servers communicate with one another during a commitment phase.

29. The apparatus of claim 23, wherein the user is authenticated only if all of the at least two authentication servers authenticate the received authentication information.

30. The apparatus of claim 23, wherein a session identifier is associated with said received authentication information.

31. The apparatus of claim 23, wherein said at least one hardware device is further configured to distinguish between a mistyped passcode and a random passcode.

32. The apparatus of claim 23, wherein the authentication information is processed by said at least two authentication servers at a key level using one or more partial keys.

33. The apparatus of claim 32, wherein the one or more partial keys are progressively released by said at least two authentication servers.

34. An article of manufacture for authenticating a user, comprising a non-transitory machine readable recordable storage medium containing one or more programs which when executed implement the steps of:
receiving authentication information from the user; and
authenticating the user based on the received authentication information using at least two authentication servers, wherein the received authentication information is based on a secret shared between a security token associated with the user and an authentication authority that provides the at least two authentication servers, wherein said step of authenticating the user further comprises at least a first one of said authentication servers computing at least one intermediate value as a function of a symmetric secret key and wherein said first one of said authentication servers (i) stores said at least one intermediate value as at least one intermediate state, and (ii) processes said at least one intermediate value for transmission to a second one of said authentication servers.

* * * * *